United States Patent
Koch et al.

(10) Patent No.: US 8,793,241 B2
(45) Date of Patent: Jul. 29, 2014

(54) INCREMENTAL QUERY EVALUATION

(75) Inventors: Christoph E. Koch, Ithaca, NY (US); Yanif Ahmad, McClean, VA (US)

(73) Assignee: Cornell University, Ithaca, NY (US)

( * ) Notice: Subject to any disclaimer, the term of this patent is extended or adjusted under 35 U.S.C. 154(b) by 77 days.

(21) Appl. No.: 13/379,386

(22) PCT Filed: Jun. 25, 2010

(86) PCT No.: PCT/US2010/039982
§ 371 (c)(1),
(2), (4) Date: Apr. 12, 2012

(87) PCT Pub. No.: WO2010/151759
PCT Pub. Date: Dec. 29, 2010

(65) Prior Publication Data
US 2012/0197865 A1 Aug. 2, 2012

Related U.S. Application Data

(60) Provisional application No. 61/220,256, filed on Jun. 25, 2009.

(51) Int. Cl.
*G06F 17/30* (2006.01)
*G06F 15/16* (2006.01)

(52) U.S. Cl.
USPC ............................ 707/713; 707/717; 707/719

(58) Field of Classification Search
CPC .................... G06F 17/30457; G06F 17/30306; G06F 17/30463
USPC ......................................... 707/719, 713, 717
See application file for complete search history.

(56) References Cited

U.S. PATENT DOCUMENTS

| | | | |
|---|---|---|---|
| 5,920,873 | A | 7/1999 | Van Huben et al. |
| 6,006,216 | A | 12/1999 | Griffin et al. |
| 6,026,390 | A | 2/2000 | Ross et al. |
| 6,505,190 | B1 | 1/2003 | Harel et al. |
| 6,581,205 | B1 | 6/2003 | Cochrane et al. |
| 6,701,345 | B1 | 3/2004 | Carley et al. |
| 6,882,993 | B1 | 4/2005 | Lawande et al. |
| 7,672,964 | B1 | 3/2010 | Yan et al. |
| 2003/0204499 | A1* | 10/2003 | Shahabi et al. ............. 707/3 |
| 2004/0098390 | A1* | 5/2004 | Bayliss et al. ............. 707/7 |
| 2005/0234971 | A1 | 10/2005 | Folkert et al. |
| 2006/0101073 | A1* | 5/2006 | Popa et al. ............. 707/104.1 |
| 2006/0173861 | A1 | 8/2006 | Bohannon et al. |

(Continued)

FOREIGN PATENT DOCUMENTS

| | | |
|---|---|---|
| EP | 0573200 A2 | 12/1993 |
| WO | 0233541 A2 | 4/2002 |

OTHER PUBLICATIONS

Abadi, D. J. et al. Aurora: a new model and architecture for data stream management. The VLDB Journal 12(2) (2003), 120-139.

(Continued)

*Primary Examiner* — Alex Gofman
(74) *Attorney, Agent, or Firm* — Burns & Levinson LLP; Jacob N. Erlich; Orlando Lopez

(57) ABSTRACT

A system and method for implementing incremental evaluation that is advantageous over nonincremental evaluation. The system and method incrementally maintain each individual aggregate value, for non-nested queries, using a constant amount of work.

19 Claims, 4 Drawing Sheets

(56) References Cited

U.S. PATENT DOCUMENTS

| | | | |
|---|---|---|---|
| 2007/0180490 A1 | 8/2007 | Renzi et al. | |
| 2007/0239691 A1 | 10/2007 | Ordonez et al. | |
| 2008/0069345 A1* | 3/2008 | Rubin | 380/44 |
| 2008/0306903 A1 | 12/2008 | Larson et al. | |
| 2009/0006329 A1 | 1/2009 | Cong et al. | |
| 2009/0024571 A1* | 1/2009 | Thiyagarajan et al. | 707/2 |
| 2009/0106214 A1* | 4/2009 | Jain et al. | 707/4 |
| 2010/0082646 A1* | 4/2010 | Meek et al. | 707/752 |

OTHER PUBLICATIONS

Agrawal, J. et al. Efficient Pattern Matching over Event Streams. Proceedings of the 2008 ACM SIGMOD international conference on Management of data, Jun. 9-12, 2008.

Ahmad, Y. et al. DBToaster: A SQL Compiler for High-Performance Delta Processing in Main-Memory Databases. DBMS (2009) vol. 2, Issue: 2, 1566-1569.

Arasu, A. et al. Linear Road: A Stream Data Management Benchmark. Data Management (2004) vol. 30, 480-491.

Baulier, J.D. et al. The Datablitz™ Main-Memory Storage Manager: Architecture, Performance, and Experience. Proc. 24 International Conference on Very Large Databases (VLDB), Aug. 1998.

Blakely, J. A. et al. Efficiently Updating Materialized Views. ACM SIGMOD Record 15 (2), Jun. 1986.

Boncz, P. et al. MonetDB/X100: Hyper Pipelining Query Execution. Proc. 2005 CIDR Conference, 225-237.

Buneman, O. P. et al. Efficiently Monitoring Relational Databases. Journal ACM Transactions on Database Systems (TODS), vol. 4 Issue 3, Sep. 1979, 368-382.

Chao, C-M. Incremental Maintenance of Object-Oriented Views in a Warehousing Environment. Tamkang J. Sci. & Eng. 5(4), 253-261 (2002).

Gupta, A. et al. Maintenance of Materialized Views: Problems, Techniques and Applications. Published in: Materialized views, MIT Press Cambridge, MA, USA © 1999.

Gupta, A. et al. Counting solutions to the View Maintenance Problem. In Workshop on Deductive Databases, JICSLP (1992), 185-194.

Kallman, R. et al. H-Store: A High-Performance, Distributed Main Memory Transaction Processing System. Proceedings of the VLDB Endowment, vol. 1, Issue 2, Aug. 2008.

Kotidis, Y. et al. A Case for Dynamic View Management. ACM Transactions on Database Systems (TODS), vol. 26, Issue 4, Dec. 2001.

Motwani, R. et al. Query Processing, Resource Management, and Approximation in a Data Stream Management System. Proceedings of the 2003 CIDR Conference (2003).

Newton, R.R. et al. Design and Evaluation of a Compiler for Embedded Stream Programs. ACM Sigplan Notices (2008) vol. 43, Issue: 7, pp. 131.

O'Neil, P. et al. Star Schema Benchmark. Online Publication of Database Generation program, Jan. 2007, Revision 3, Jun. 5, 2009.

Shmueli, O. et al. Maintenance of Views. ACM SIGMOD, vol. 14, Issue 2, Jun. 1984.

Zhou, J. et al. Dynamic Materialized Views. IEEE 23rd International Conference on Data Engineering, 2007, Apr. 15-20, 2007, 526-535. International Search Report and Written Opinion for PCT/US10/39982 dated Feb. 23, 2011.

\* cited by examiner

|  |  |  | $f(x)$ |  |  |  |
|---|---|---|---|---|---|---|
|  | $\Delta f(x,-1)$ |  |  |  | $\Delta f(x,+1)$ |  |
| $x$ | $\Delta^2 f(x,-1,-1)$ |  | $\Delta^2 f(x,-1,+1)$ |  $\Delta^2 f(x,+1,-1)$ |  | $\Delta^2 f(x,+1,+1)$ |
| 0 | 6 | 3 | −6 | 0 | −6 | 3 | 6 |
| 1 | 6 | −3 | −6 | 3 | −6 | 9 | 6 |
| 2 | 6 | −9 | −6 | 12 | −6 | 15 | 6 |
| 3 | 6 | −15 | −6 | 27 | −6 | 21 | 6 |
| 4 | 6 | −21 | −6 | 48 | −6 | 27 | 6 |

FIG. 1

| Time | ΔC | Δq[1] q[1] | Δq[2] q[2] | Δq[3] q[3] | Δq[4] q[4] |
|---|---|---|---|---|---|
| 1 | insert (1,US) | +1    1 | | | |
| 2 | insert (2,US) |    1 | +1    1 | | |
| 3 | insert (3,US) |    1 | +q2[2,UK]  2 | +q1[UK] + 1  2 | |
| 4 | insert (4,US) | +q2[4,US]  2 |    2 |    2 | +q1[US] + 1  2 |
| 5 | insert (3,US) |    2 | −q2[3,UK]  1 | A    0 |    2 |
| 6 | insert (3,US) | +q2[3,US]  3 | +q2[3,US] 3 | +q1[US] + 1  3 | +q2[3,US]  3 |

A: −q1[UK] − q2[3,UK] + 1

$\underbrace{\text{−q1[UK]}}_{-2}$ $\underbrace{\text{− q2[3,UK]}}_{-1}$ + 1

FIG. 2

INCREMENTAL QUERY EVALUATION

CROSS REFERENCE TO RELATED APPLICATIONS

This application is the U.S. national phase entry under 35 U.S.C. §371 of International Patent Application No. PCT/US10/39982 filed Jun. 25, 2010, entitled INCREMENTAL QUERY EVALUATION, which in turn claims priority from U.S. Provisional Application Ser. No. 61/220,256, filed Jun. 25, 2009, entitled AGGRESSIVE COMPILATION FRAMEWORK FOR CONTINUOUS QUERY PROCESSING ON UPDATE STREAMS, both of which are incorporated by reference herein in their entirety for all purposes.

STATEMENT REGARDING FEDERALLY SPONSORED RESEARCH OR DEVELOPMENT

This invention was made with Government support under Grant Number FA9550-06-1-0111 awarded by the Air Force Office of Scientific Research. The United States Government has certain rights in the invention.

BACKGROUND

The system and method of the present embodiment relate generally to processing queries using incremental processing techniques.

Modern relational databases focus almost exclusively on providing flexible and extensible querying capabilities in dynamic environments, supporting both schema and data evolution. As a consequence, today's database management systems are centered around highly flexible interactive query processors, with their plan interpreters and other runtime components including schedulers and optimizers. However, a large fraction of the world's query workloads are fixed and embedded into database application programs. In these applications, queries are ossified during the development cycle, with developers converging to a choice of schema, query structure and parameters. Once hardened, queries are deployed into production environments, and reused numerous times, executing non-interactively. Other stream processing engines and relational databases provide a development environment for authoring stream processing applications. Data stream processing addresses the problem of processing standing queries over a limited form of database, namely sliding windows on sequential data. A window restricts the set of data to be processed to a very specific subset, typically a recent period of time. Incremental view maintenance on the other hand considers queries on a general database, that can be modified in any manner, and does not need to consist of only recent data. However the limitation of view maintenance lies in the class of queries supported, especially in terms of nested aggregates, and subqueries, and has been shown to have problems scaling to handle large volumes of changing data. Thus neither of these solutions is sufficient for financial, monitoring, and database applications, among others.

Most databases evolve incrementally, through changes that are small compared to the overall database size. For queries that are asked repeatedly, memoization of the query result can substantially reduce the amount of work needed to re-evaluate the query after moderate changes to the database. Using stored query results or auxiliary data structures to this effect is known as incremental view maintenance. A key notion in incremental view maintenance is that of a delta query. A change ("update", which captures both insertions and deletions) to database D is denoted by u. The updated database is denoted by D+u, where + is a generalization of the union operation of relational algebra. A delta query $\Delta_u Q$ depends on both D and u and expresses the change to the result of query Q as D is updated to D+u:

$$Q(D+u)=Q(D)+\Delta_u Q(D).$$

Evaluating $\Delta_u Q(D)$ and using the result to update a materialized representation of Q(D) can be faster than recomputing Q(D+u) from scratch, because $\Delta Q$ is a simpler query than Q. Queries for which this is not true, e.g., queries with aggregates nested into conditions, may not be included in incremental view maintenance studies. It may not be clear that incremental view maintenance is more efficient than nonincremental query evaluation. If a query language L with multiset semantics is closed under joins (such as SQL), the image of L under taking deltas is the full language L: Given an arbitrary query $Q_0 \in L$, there is another query $Q \in L$ and a single-tuple insertion u such that $\Delta_u Q = Q_0$. If u is an arbitrary single-tuple insertion into a relation R that does not occur in $Q_0$, then Q is $Q_0 \times \pi_\emptyset R$, which suggests that incremental view maintenance is not advantageous over nonincremental query evaluation. A system and method are needed that implement incremental evaluation that is advantageous over nonincremental evaluation. A system and method are further needed for incrementally maintaining each individual aggregate value, for non-nested queries, using a constant amount of work per data item or data value incrementally maintained. A system and method are still further needed to develop automated trading algorithms having reduced development time and better throughput and lower latency for queries over level II (i.e. orderbook) data. A system and method are even still further needed for a query processing framework. This framework could be used, for example, but not limited to, for monitoring applications that could enable uniformly using the core of a high-level declarative language such as SQL across the multiple heterogeneous computing platforms present in such applications, by transforming to low-level code and customizing such code to execute on embedded devices such sensor motes, and cell phones.

SUMMARY

The needs set forth above as well as further and other needs and advantages are addressed by the embodiments set forth below. The present embodiment solves the problem of processing standing queries over a rapidly, and arbitrarily changing database, using incremental processing techniques.

The present embodiment provides incremental view maintenance based on an algebraic perspective. In the present embodiment, a ring of databases can be used as the foundation of a query calculus that allows expression of aggregate queries. The query calculus can inherit properties of the ring, such as having a normal form of polynomials and being closed under computing inverses and delta queries. The k-th delta of a polynomial query of degree k without nesting becomes, in the present embodiment, a function of the update, not of the database. Using the present embodiment, expensive query operators such as joins can be eliminated from programs that perform incremental view maintenance. The main result is that, for non-nested queries, each individual aggregate value can be incrementally maintained using a constant amount of work. This is not possible for nonincremental evaluation.

The present embodiment is related to both data stream processing, and incremental view maintenance. As described, the delta of a query is a query itself. Subsequently, a $k^{th}$ delta of a query, also called a query of the $k^{th}$ level, and an input specification is a specification of level zero.

The system and method of the present embodiment can recursively apply compilation to transform delta forms such as, for example, queries, to simpler and simpler queries, by considering combinations of base relation deltas. Recursive compilation in the present embodiment completes with queries that can be represented as simple procedural code statements. The system and method of the present embodiment can maintain each delta form encountered as a map datastructure, essentially a group-by aggregate index derived from applying aggregate distributivity properties together with join-graph decompositions. The procedural code generated by recursively compiling the delta forms maps can incrementally maintain the maps. The system and method can be enabled by an exemplary map algebra that can be used to represent and reason about queries and map datastructures, and can be used to perform recursive compilation through a set of transformation rules defined in the map algebra.

The present embodiment can include a framework by which SQL aggregate queries can be compiled into C++ code for continuous, incremental view maintenance. The SQL query compilation framework of the present embodiment can generate native code that can incrementally and continuously maintain aggregate views, for example, but not limited to, in main memory, using aggressive delta processing techniques. The system and method of the present embodiment can recursively compile queries into incremental view maintenance code; that is, instead of expressing and evaluating increments to queries as queries, the system and method of the present embodiment recursively compute increments to these increments, and so on, which can eliminate all queries. The system and method of the present embodiment can include, but are not limited to including, an aggressive compilation mechanism for transforming SQL queries to low-level code. Aggressive compilation refers to recursive compilation of queries into code. View maintenance algorithms typically consider a type of modification (insert, update, or delete) to a view, and derive a query to process this modification. However, this is only a single level of incremental computation, and the job of view maintenance overall still relies on queries. On the contrary, the system and method of the present embodiment recursively apply compilation on these resulting queries, until all queries are eliminated, leaving low-level code. Characteristics of aggressive compilation can include, but are not limited to including, aggressive inlining and rule-based transformation of a SQL query plan to produce event-handling functions capable of processing queries and producing results. The system and method of the present embodiment produce one event handling function for each type of modification event (insert, update, or delete) on any input relation to the query. Aggressive compilation can replace query plans (i.e. graphs) with event handling functions. Query graphs typically include dataflow between operators, which in turn hold queues and data structures as state to support their computation. The system and method of the present embodiment can transform and inline the operators, completely eliminating queues, and can determine which data structures to maintain to support the query, in its entirety, and in particular for each type of modification event, rather than at the individual operator level. In the system and method of the present embodiment, data structures can be reused across different modification events.

For a better understanding of the present embodiments, together with other and further embodiments thereof, reference is made to the accompanying drawings and detailed description.

DESCRIPTION OF THE SEVERAL VIEWS OF THE DRAWING

FIG. 1 is a table of results from recursive memoization of deltas for $f(x)=3x^2$;

FIG. 2 is a table of a trace of map q that changes during a sequence of insertions and deletions;

DETAILED DESCRIPTION

Figure 3:
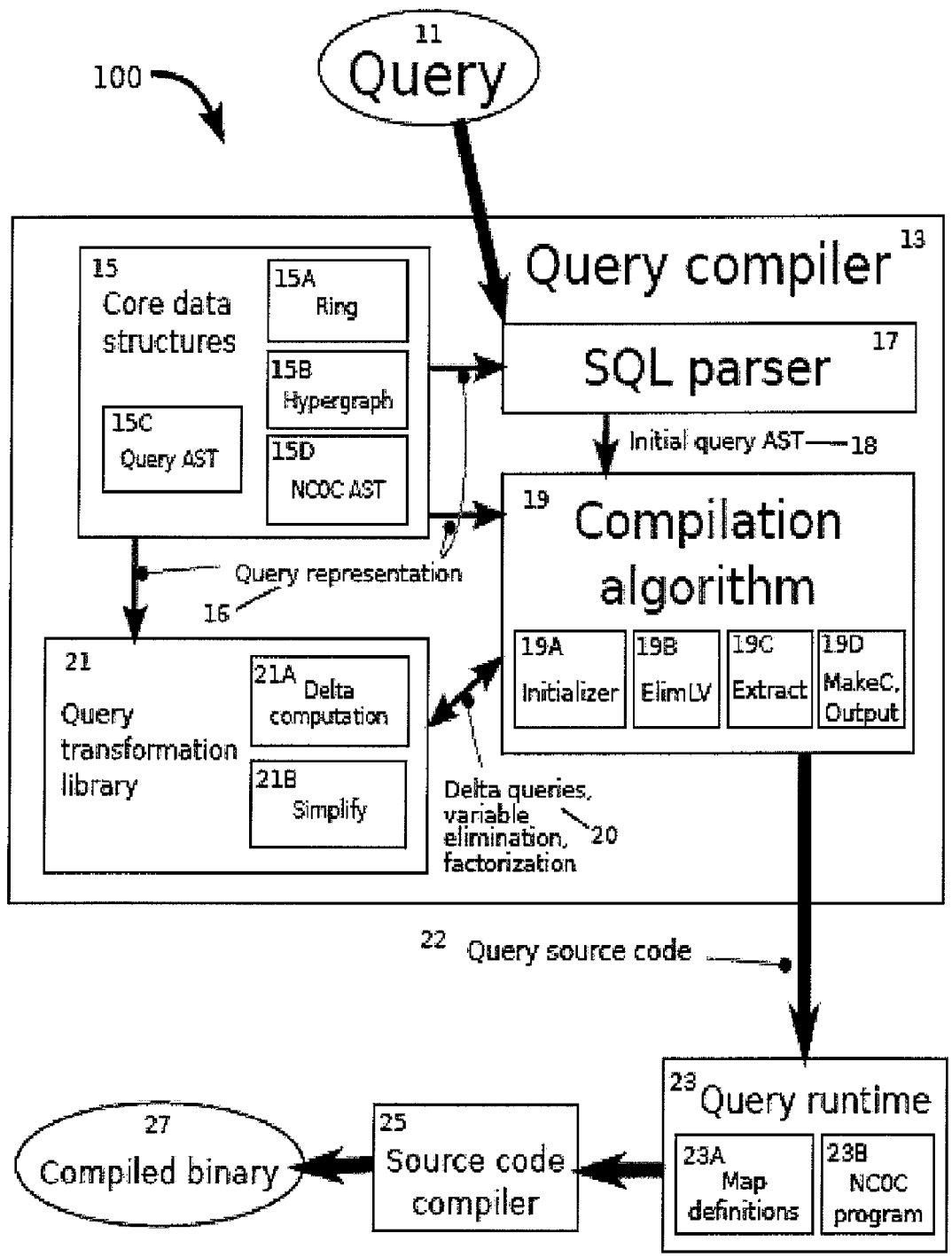
FIG. 3 is a schematic block diagram of the system of the present embodiment.

The present embodiments are now described more fully hereinafter with reference to the accompanying drawings. The following configuration description is presented for illustrative purposes only. Any computer configuration and architecture satisfying the speed and interface requirements herein described may be suitable for implementing the system and method of the present embodiments.

The present embodiment can be described with reference to function $f: A \rightarrow B$ such that $(A, +)$ is an additive semigroup (i.e, set A is closed under a binary operation +) and $(B, +)$ is an additive group (i.e., a semigroup with an additive identity $0^B$ and an additive inverse). For an $u \in A$, function $\Delta_u f: A \rightarrow B$ is defined as $$\Delta_u f: x \mapsto f(x+u) - f(x).$$

$\Delta_u f(x)$ is the amount of change that happens to the value of $f(x)$ as the value of x is changed to x+u ("updated by u").

Function $\Delta^j f$ of j-th deltas for $j \geq 0$ is defined as $$A \times U^j \rightarrow B$$

$$\langle x, u_1, \ldots, u_j \rangle \mapsto (\Delta_{u_j}(\Delta_{u_{j-1}} \ldots (\Delta_{u_1} f) \ldots))(x).$$

where $\Delta^0 f$ is $f$. $x \in A$ is considered current. x can be updated with increments from a set of possible updates $U \subseteq A$ and to obtain $f(x)$ without having to recompute it "from scratch" after each change to x. $f$ has the property that there is a $k \in N$ such that $\Delta^k f$ is $0^B$ on all inputs. If $0 \leq j \leq k$ and $\vec{u} \in U^j$, the values $\Delta^j f(x, \vec{u})$ for the current x are known. If additions and subtractions can be performed cheaply, but it is expensive to compute $\Delta^j f(x_{new}, \vec{u})$ from $x_{new}$ ($j \geq 0$). On update event $x_{new} := x_{cur} + u$, compute $$\Delta^j f(x_{new}, \vec{u}) := \Delta^j f(x_{curr}, \vec{u}) + \Delta^{j+1} f(x_{curr}, \vec{u}, u),$$

for all $0 \leq j < k$ and $\vec{u} \in U^j$. This requires only additions of memorized $\Delta^j f$ values. If the sums are computed in order of increasing j, double-buffering may not be necessary but the values can be updated in place, i.e., $\Delta^j f(x, \vec{u}) += \Delta^{j+1} f(x, \vec{u}, u)$. None of these values have to be recomputed from their (function) definitions. For example, if $f(x)=3x^2$, $$\Delta f(x, u_1) = f(x+u_1) - f(x)$$
$$= 3(x+u_1)^2 - 3x^2$$
$$= 6u_1 x + 3u_1^2.$$

$$\Delta^2 f(x, u_1, u_2) = (\Delta f(x+u_2, u_1)) - \Delta f(x, u_1)$$
$$= 6u_1(x+u_2) + 3u_1^2 - (6u_1 x + 3u_1^2)$$
$$= 6u_1 u_2.$$

-continued $$\Delta^3 f(x, u_1, u_2, u_3) = (\Delta^2 f(x+u_3, u_1, u_2)) - \Delta^2 f(x, u_1, u_2)$$
$$= 6u_1u_2 - 6u_1u_2$$
$$= 0.$$

The set of possible updates is U=±1, seven function values are memorized, and values are computed for them from the definitions of $f$, $\Delta f$, and $\Delta^2 f$. $|U|^0+|U|^1+|U|^2=7$ values are computed from the definitions only once, for the initial x value, and additions of the current seven values are performed. FIG. 1 shows values for x=0, . . . , 4. At any point in time (for any current x value), one row of this table, with seven values, can be held in memory, and x is incremented or decremented by one, which corresponds to changing the memorized row to its predecessor or successor in the table of FIG. 1. To perform this replacement, one other memorized value is added to each memorized value. For example, if x=3 and x is incremented by 1. Then $f(x)+=21=48$, $\Delta^1 f(x,+1)+=6=27$, $\Delta^1 f(x, -1)+=-6=-15$, and $\Delta^2 f(x,\bullet,\bullet)+=0$. This memoization technique can be converted to an incremental view maintenance algorithm as follows. The functions $f:A \to B$ can be queries, and A can be a domain of databases. For this analogy to hold, the query language L must have two properties: the query language L has to be closed under taking deltas, that is, for each query of L, a delta query has to be expressible in L; L has to support the addition of a query and its delta; and for each query, there must be a k∈N such that the k-th delta query returns constantly the empty database.

Given a query $f$, this technique memorizes a hierarchy of materialized views representing the functions $$<u_1, \ldots, u_j> \mapsto \Delta^{jf}(x, u_1, \ldots, u_j)$$

for $0 \leq j \leq k$. x is the current database. The (active) domains of these functions are finite, and their graphs can be captured by group-by queries, grouping the results by the tuples $<u_1, \ldots, u_j>$. For example, the following SQL query over unary relation R with schema A and multiset semantics can be stated as $$Q(R) = \text{select count}(*) \text{ from } R\ r1, R\ r2 \text{ where } r1.A = r2.A$$

The delta queries for single-tuple insertions (denoted +R(a)) and deletions (denoted −R(a)) are $$\Delta Q(R, \pm R(a)) = 1 \pm 2*$$

(select count(*) from R where R.A=a)

$$\Delta^2 Q(R, \pm_1 R(a_1), \pm_2 R(a_2)) = \begin{cases} \pm_1 \pm_2 2 & \ldots & a_1 = a_2 \\ 0 & \ldots & \text{otherwise} \end{cases}$$

and $\Delta^i Q(R,\bullet,\bullet,\bullet)=0$.
The above definitions give $Q(\emptyset)=0$ and $\Delta Q(\emptyset, \pm R(\cdot))=1$.

| Update | R | Q(R) | ΔQ(R, •) +R(c) | −R(c) | +R(d) | −R(d) |
|---|---|---|---|---|---|---|
|  | ∅ | 0 | 1 | 1 | 1 | 1 |
| +R(c) | {c} | 1 | 3 | −1 | 1 | 1 |
| +R(c) | {c, c} | 4 | 5 | −3 | 1 | 1 |
| +R(d) | {c, c, d} | 5 | 5 | −3 | 3 | −1 |
| +R(c) | {c, c, c, d} | 10 | 7 | −5 | 1 | −1 |
| −R(d) | {c, c, c} | 9 | 7 | −5 | 1 | 1 |
| +R(c) | {c, c, c, c} | 16 | 9 | −7 | 1 | 1 |
| −R(c) | {c, c, c} | 9 | 7 | −5 | 1 | 1 |

In the above table, $\Delta^2 Q$ is omitted for space reasons. It is constant (does not depend on the database), and $$\Delta^2 Q(R,+R(a),+R(a))=\Delta^2 Q(R,-R(a),-R(a))=2,$$

$$\Delta^2 Q(R,+R(a),-R(a))=\Delta^2 Q(R,-R(a),+R(a))=-2,$$

and $\Delta^2 Q(R, \pm_1 R(a_1), \pm_2 R(a_2))=0$ for $a_1 \neq a_2$.

Queries are evaluated and the database is accessed to initialize the memorized values. After that, the update rule is used $$\Delta^j f(x_{new}, \vec{u}) := \Delta^j f(x_{curr}, \vec{u}) + \Delta^{j+1} f(x_{curr}, \vec{u}, u),$$

to apply an update u. In this incremental view maintenance technique delta processing is performed recursively along with materializing view Q and using ΔQ to update it. ΔQ is materialized, incrementally maintained using $\Delta^2 Q$, the result is materialized, and so on.

The query language that is required for the present embodiment encompasses a large class of SQL (aggregate) queries. The algebraic structure of a ring of databases of the present invention includes an addition operation that generalizes relational union, and a multiplication operation that generalizes the natural join. The elements of the ring are generalizations of multi-set relational databases in which tuples can have negative multiplicities (to model deletions). There are further generalizations shown to be necessary in the present embodiment, in addition to a full additive inverse (necessary for delta processing) and distributivity (to yield polynomials). The ring is the basis of the definition of an expressive aggregate query calculus, AGCA, which inherits these key properties. For an AGCA query Q without nested aggregates, Aα exists and is structurally strictly simpler than Q. The k-th delta of an AGCA query of degree k without nested aggregates has degree 0; a query of degree 0 only depends on the update but not on the database. Thus, the recursive delta processing technique of the present embodiment is applicable to AGCA. Each query can be incrementally maintained by a hierarchy of materialized views, requiring only basic summations of values in adjacent layers of the view hierarchy to keep all views up to date. Only a single arithmetic operation is required per single-tuple update and per value maintained in this hierarchy of views. For the purpose of aggregate query processing, these values are numerical. In practice, such values can be represented using fixed-size memory words.

The present embodiment can maintain finite active domains of the memorized functions, and can extend these when updates require it. More fundamentally, a j-th delta is a function of a j-tuple of update tuples, which means that its domain and the, for example, tabular representation of the memorized function may become large. The present embodiment can employ query factorization and simplification of queries, which can allow the creation of small representations of the materialized views. The present embodiment includes a method for compiling queries to a simple low-level language which can be, but is not limited to being, related to the programming language C. The present embodiment can eliminate all joins and evaluate queries without resorting to classical query operators. The compiler of the present embodiment produces, for example, source code or object code, that can be edited or simply linked in with existing client application code as, for example, an embeddable query processor.

The notations $f:x \mapsto v$, $f(x):=v$, and $f:=\{x \mapsto v \diamond x \in \text{dom}(f)\}$ are used interchangeably to define functions, with a preference for the latter when the domain dom($f$) might otherwise remain unclear. $f|_D$ denotes the restriction of the domain of $f$ to D, i.e. $f|_D := \{(x \mapsto v) \in f \blacklozenge x \in D\}$. A function $f$: A→B is called surjective if for all b∈B, there is an a∈A such that $f(a)=b$.

A semigroup is a pair (A, °) of a base set A and a binary total function ○:A×A→A ("the operation") such that ○ is associative, that is, for all a, b, c∈A, (a○b)○c=a○(b○c). A semigroup is called commutative if a○b=b○a for all a, b∈A. A monoid (A,○,e) is a semigroup that has neutral element e∈A, that is, a○e=e○a=a for all a∈A. A monoid is called a group if for each a∈A there is an inverse element $a^{-1}$∈A such that $a○a^{-1}=a^{-1}○a=e$.

A ring over base set A is a tuple (A,+,*,0) with two operations + and * (called addition and multiplication, respectively) such that (A,+,0) is a commutative group, (A,*) is a semigroup, and + and * are distributive, that is, a*(b+c)=a*b+a*c and (a+b)*c=a*c+b*c for all a, b, c∈A. A ring with identity (A,+,*,0,1) is a ring in which (A,*,1) is a monoid. A ring is called commutative if * is commutative. For example, the integers Z and the rational numbers Q form commutative rings with identity (Z,+,*,0,1) and (Q,+,*,0,1). The natural numbers N do not form a ring because there is no additive inverse; for example, there is no natural number x such that 1+x=0.

Neutral elements 0 and 1 are named by analogy and are not necessarily numbers. For a group with an operation +, -a denotes $a^{-1}$ and the shortcut a-b denotes a+(-b). When the operations + and * are clear from the context, the name of the base set is used herein to denote the ring (e.g., Z for (Z,+,*,0,1)). In a monoid, there is a unique identity element and in a group (A,○,e), there is a unique inverse element $a^{-1}$ for each element a∈A. Thus, in particular, a ring is uniquely determined by its base set and its operations + and *.

A is a commutative ring such as the integers Z, the rational numbers Q, or the real numbers R. A structure $(A_{Rel},+,*,0,1)$ (or just $A_{Rel}$, for short) of generalized multiset relations denotes collections of tuples with multiplicities from A and possibly differing schemas. The operations + and * are generalizations of multiset union and natural join, respectively, to total functions (i.e., applicable to any pair of elements of $A_{Rel}$). The schema polymorphism of tuples in generalized multiset relations serves the purpose of accommodating such total operator definitions.

A (typed) tuple $\vec{t}$ is a partial function from a vocabulary of column names $dom(\vec{t})$ to data values (that is, $\vec{t}$ is not just a tuple of values but has an associated schema of its own). In the present description, all tuples are typed, and Tup denotes the set of all typed tuples. $\{\vec{t}\}$ denotes construct a singleton relation with schema $sch(\{\vec{t}\})=dom(\vec{t})$ from $\vec{t}$ and the classical natural join operator ⋈ is used on such singletons. The set of all singletons is denoted by Sng (i.e., $Sng:=\{\{\vec{t}\}|\vec{t} \in Tup\}$). For a commutative ring A, a generalized multiset relation (gmr) is a function R: Tup→A such that $R(\vec{t})\neq 0$ for at most a finite number of tuples $\vec{t}$. The set of all such functions is denoted by $A_{Rel}$. Such a function indicates the multiplicity with which each tuple of Tup occurs in the gmr. Tuples can have negative multiplicities. The operations + and * of $A_{Rel}$ are defined as follows.

For $R, S \in A_{Rel}$, $$R+S: \vec{x} \mapsto (R(\vec{x})+S(\vec{x}))$$

-continued $$R*S: \vec{x} \mapsto \sum_{\{\vec{x}\}=\{\vec{a}\}\bowtie\{\vec{b}\}} R(\vec{a})*S(\vec{b})$$

It follows:

$$(-R): \vec{x} \mapsto (-R(\vec{x}))$$

$$1: \vec{x} \mapsto \begin{cases} 1 & \ldots \vec{x} = \langle \rangle \\ 0 & \ldots \vec{x} \neq \langle \rangle \end{cases}$$

$$0: \vec{x} \mapsto 0$$

On classical multiset relations (where all multiplicities are ≥0 and all tuples with multiplicity>0 have the same schema), * is the usual multiset natural join operation.

Given the three gmrs of $A_{Rel}$

| R | A | B |  | S | C |  | T | B | C |  | Example 1 |
|---|---|---|---|---|---|---|---|---|---|---|---|
| $a_1$ |  | ↦ $r_1$ |  | c | ↦ s |  | c | ↦ $t_1$ |  |  |
| $a_2$ | b | ↦ $r_2$ |  |  |  |  | b | c | ↦ $t_2$ |  | over column name vocabulary $\Sigma=\{A,B,C\}$ and value domain $adom=\{a_1,a_2,b,c\}$. For example, in multiset relation R, two tuples of different schema have a multiplicity other than 0. These two tuples can be specified as partial functions $\Sigma \to adom$: $\{A \mapsto a_1\}$ and $\{A \mapsto a_2; B \mapsto b\}$.

Then S+T and R*(S+T) are as follows:

| S+T | B | C |  |  |
|---|---|---|---|---|
|  |  | c | \| | → $s+t_1$ |
|  | b | c | \| | → $t_2$ |

| R*(S+T) | A | B | C |  |  |
|---|---|---|---|---|---|
|  | $a_1$ |  | c | ↦ | $r_1*(s+t_1)$ |
|  | $a_1$ | b | c | ↦ | $r_1*t_2$ |
|  | $a_2$ | b | c | ↦ | $r_2*(s+t_1)+r_2*t_2$ |

The missing values should not be taken as SQL null values, and * is not an outer join. $(A_{Rel},+,*,0,1)$ is a commutative ring with identity.

AGCA defines two forms of query expressions, formulae and terms. Formulae evaluate to elements of the ring $(A_{Rel},+,*,0,1)$ of gmrs. Terms evaluate to elements of the ring (A,+,*,0,1). Terms and formulae are connected mutually recursively, creating a powerful language for expressing aggregate queries. Both formulae and terms, and thus the overall query language, inherit the key properties of polynomial rings in that they have an additive inverse, a normal point of polynomial expressions, and admit a form of factorization. These properties are the basis of delta processing and incremental query evaluation in subsequent sections. Formulae are expressions built from atomic formulae using +, -, and *. The atomic formulae are true, false, relational atoms $R(\vec{x})$ where $\vec{x}$ is a tuple of variables, and atomic conditions of the form t θ 0 comparing term t with 0 using comparison operations θ from =, ≠, >, ≥, <, and ≤. AGCA terms are built from variables, built-in function calls (constants are functions with zero arguments), and aggregate sums (Sum) using addition, its inverse, and multiplication. Built-in functions compute their result entirely based on their input terms, not accessing the database. The abstract syntax of formulae φ and terms t (given variables x, relation names R, comparison operators θ, and constants/builtin functions $f$) can be given by the EBNF $$\phi ::= \phi * \phi | \phi + \phi | -\phi | \text{true} | \text{false} | R(\vec{x}) | t\theta 0$$

$$t ::= t * t | t + t | -t | f(t^*) | x | \text{Sum}(t, \phi)$$

xθy can be written as (x−y)θ0. Formulae φ*ψ*π can be read as (φ*ψ)*π. The formal semantics of AGCA is given by mutually recursive functions $[[\bullet]]_F(\bullet,\bullet)$ and $[[\bullet]]_T(\bullet,\bullet)$ for formulae and terms, respectively. Given database A and a bound variable tuple $\vec{b}$ (i.e., a function that maps each bound variable to a value), $[[\phi]]_F(A,\vec{b})$ evaluates to an element of $A_{Rel}$ and $[[t]]_T(A,\vec{b})$ evaluates to a value from A. The semantics of AGCA formulae is defined as follows.

$$[[\varphi + \psi]]_F(A, \vec{b}) := [[\varphi]]_F(A, \vec{b}) +^{A_{Rel}} [[\psi]]_F(A, \vec{b})$$

$$[[-\varphi]]_F(A, \vec{b}) := -^{A_{Rel}} [[\varphi]]_F(A, \vec{b})$$

$$[[\varphi * \psi]]_F(A, \vec{b}) := [[\varphi]]_F(A, \vec{b}) *^{A_{Rel}} [[\psi]]_F(A, \vec{b})$$

$$[[\text{true}]]_F(A, \vec{b}) := 1^{A_{Rel}}$$

$$[[\text{false}]]_F(A, \vec{b}) := 0^{A_{Rel}}$$

$$[[\varphi * (x - y = 0)]]_F(A, \vec{b}) :=$$

$$\vec{x} \mapsto \begin{cases} [[\varphi]]_F(A, \vec{b})(\vec{x}) + \\ [[\varphi]]_F(A, \vec{b})(\vec{x}|_{dom(\vec{x})\setminus\{y\}}) + \\ [[\varphi]]_F(A, \vec{b})(\vec{x}|_{dom(\vec{x})\setminus\{x\}}) & \ldots & [[t]]_T(A, \vec{b} \cup \vec{x})\theta 0 \\ & & \text{and } \{\vec{b}\} \bowtie \{\vec{x}\} \neq \emptyset \\ 0 & \ldots & \text{otherwise} \end{cases}$$

$$[[\varphi * (t\theta 0)]]_F(A, \vec{b}) := ( * t\theta 0 \text{ is not of form } x - y = 0 *) \vec{x} \mapsto$$

$$\begin{cases} [[\varphi]]_F(A, \vec{b})(\vec{x}) & \ldots & [[t]]_T(A, \vec{b} \cup \vec{x})\theta 0 \\ & & \text{and } \{\vec{b}\} \bowtie \{\vec{x}\} \neq \emptyset \\ 0 & \ldots & \text{otherwise} \end{cases}$$

$$[[R(x_1, \ldots, x_k)]]_F(A, \vec{b}) :=$$

$$\vec{x} \mapsto \begin{cases} R^A(\vec{y}) & \ldots & \{\vec{b}\} \bowtie \{\vec{x}\} \neq \emptyset, \\ & & dom(\vec{x}) = \{x_1, \ldots, x_k\}, \\ & & sch(R) = \langle A_1, \ldots, A_k \rangle, \text{ and} \\ & & \vec{y} = \{A_i \mapsto \vec{x}(x_i) \mid 1 \leq i \leq k\} \\ 0 & \ldots & \text{otherwise.} \end{cases}$$

Typed tuples are functions: $\{\vec{b}\} \bowtie \{\vec{x}\} \neq \emptyset$ asserts that the typed tuples $\vec{b}$ and $\vec{x}$ are consistent, that is, for all y∈dom($\vec{b}$)∩dom($\vec{x}$), $\vec{b}(y)=\vec{x}(y)$. The union $\vec{b} \cap \vec{x}$ extends one typed tuple by the other. The definition of $[[R(x_1, \ldots, x_k)]]_F$ supports column renaming. For example, if R is a database relation

| $R^A$ | a | b | | |
|---|---|---|---|---|
| | $a_1$ | $b_1$ | ↦ | $r_1$ |
| | $a_2$ | $b_2$ | ↦ | $r_2$ | then

| $[[R(x, y)]]_F(A, \{y \mapsto b_1\})$ | x | y | | |
|---|---|---|---|---|
| | $a_1$ | $b_1$ | ↦ | $r_1$ |

The query renames the columns (a,b) to (x,y) and selects on y since it is a bound variable.

For example, if $a_1, \ldots, a_5 \in A=Z$ and

| $[[\varphi]]_F(A, \emptyset)$ | x | y | | |
|---|---|---|---|---|
| | 1 | | ↦ | $a_1$ |
| | 1 | | ↦ | $a_2$ |
| | 1 | 1 | ↦ | $a_3$ |
| | 1 | 2 | ↦ | $a_4$ | then

| $[[\varphi * (x < y)]]_F(A, \emptyset)$ | x | y | | |
|---|---|---|---|---|
| | 1 | 2 | ↦ | $a_4$ |

| $[[\varphi * (x = y)]]_F(A, \emptyset)$ | x | y | | |
|---|---|---|---|---|
| | 1 | 1 | ↦ | $a_1 + a_2 + a_3$ |

For example, for $\vec{x}=\{x \mapsto 1; y \mapsto 1\}$ and $\vec{b}\emptyset$, $[[x-y]]_T(A, \vec{b} \cup \vec{x})=[[x]]_T(A, \vec{b} \cup \vec{x})-[[y]]_T(A, \vec{b} \cup \vec{x})=1-1=0$ and $\{\vec{b}\} \bowtie \{\vec{x}\}=\{\vec{x}\}$, thus $$[[\phi^*(x=y)]]_F(A, \vec{b})(\vec{x})=[[\phi]]_F(A, \vec{b})(\{x \mapsto 1\})+[[\phi]]_F(A, \vec{b})(\{y \mapsto 1\})+[[\phi]]_F(A, \vec{b})(\vec{x})=a_1+a_2+a_3.$$

The semantics of AGCA terms is defined as $$[[x]]_T(A, \vec{b}) := \begin{cases} \vec{b}(x) & \ldots & x \in dom(\vec{b}) \\ \text{fail} & \ldots & \text{otherwise} \end{cases}$$

$$[[f(t_1, \ldots, t_k)]]_T(A, \vec{b}) := f([[t_1]]_T(A, \vec{b}), \ldots, [[t_k]]_T(A, \vec{b}))$$

$$[[\text{Sum}(t, \varphi)]]_T(A, \vec{b}) := \sum_{(\vec{x} \mapsto a) \in [[\varphi]]_F(A, \vec{b}), \{\vec{b}\} \bowtie \{\vec{x}\} \neq \emptyset} a *^A [[t]]_T(A, \vec{b} \cup \vec{x})$$

Take +, −, and * as binary built-in functions $f(+^A, -^A, \text{ and } *^A)$ and constants as nullary built-in functions and the definition is complete. For example, if gmr R of the previous example is, $$[[\text{Sum}(3*x, R(x, y))]](A, \emptyset) = r_1 * [[3*x]]_T(A, \{x \mapsto a_1\}) +$$

$$r_2 * [[3*x]]_T(A, \{x \mapsto a_2\})$$

$$= r_1 * 3 * a_1 + r_2 * 3 * a_2.$$

Note that $[[\bullet]]_F$ maps to elements of $A_{Rel}$; in particular, the image elements are functions Tup→A that are nonzero on at most a finite number of inputs. This is ensured by syntactically requiring each condition to be part of a product φ*(tθ0) with another formula φ that guards its domain. (In the case that a condition tθ0 is not the second argument of a multiplication, read it as formula "true*(tθ0)".) The evaluation of variables x using $[[x]]_T$ can fail if they are not bound at evaluation time. Illegal queries can be excluded from AGCA. A definition of range-restriction completely analogous to that for relational calculus, with ∧ and ∨ replaced by * and +, respectively, allows to statically verify that such runtime failures do not happen. A SQL aggregate query
SELECT $\vec{b}$, SUM(t) FROM $R_1\ r_{11}, R_1\ r_{12}, \ldots, R_2\ r_{21}, \ldots$
WHERE φ GROUP BY $\vec{b}$
is expressed in AGCA as $$\text{Sum}(t, R_1(\vec{x}_{11})*R_1(\vec{x}_{12})* \ldots *R_2(\vec{x}_{21})* \ldots *\phi)$$

with bound variables $\vec{b}$. While Sum(•,•) computes exactly one number, we can think of an SQL aggregate query with group by clause as a function $\vec{b} \mapsto [[\text{Sum}(\cdot,\cdot)]](A, \vec{b})$ that maps each group to its aggregate value. For example, relation C(cid, nation) stores the ids and nationalities of customers. The SQL query
SELECT C1.cid, SUM(1) FROM C C1, C C2
WHERE C1.nation=C2.nation
GROUP BY C1.cid;
asks, for each cid, for the number of customers of the same nation (including the customer identified by cid). This query translates to AGCA as $$\text{Sum}(1, C(c_1, n_1)*C(c_2, n_2)*(n_1=n_2))$$

with bound variable $c_1$. A language of expressions can be constructed from values ("constants") and the operations + and * of a ring A, plus variables. If these expressions evaluate to elements of a multivariate polynomial ring in the natural way, turning an expression into a polynomial, that is, a sum of flat products (the products are also known as monomials), means applying distributivity repeatedly until the result is a polynomial. This can be combined with simplification operations based on the 1 and 0-elements and the additive inverse, i.e., α*1 maps to α, α*0 maps to 0, α+0 maps to α, α+(−α) maps to 0, −(−α)=α, and (−α)*β=−(α*β). Such an algorithm for computing and simplifying expressions over a ring is applicable to AGCA formulae and terms. In particular, the operation * is distributive with + despite its sideways information passing semantics. For arbitrary terms s and t and formulae φ and ψ, Sum terms can be simplified using the following equations (to be applied by replacing a left by a right hand side expression):

$$\text{Sum}(s+t, \phi) = \text{Sum}(s, \phi) + \text{Sum}(t, \phi)$$

$$\text{Sum}(t, \phi+\psi) = \text{Sum}(t, \phi) + \text{Sum}(t, \psi)$$

$$\text{Sum}(-t, \phi) = -\text{Sum}(t, \phi)$$

$$\text{Sum}(t, -\phi) = -\text{Sum}(t, \phi)$$

$$\text{Sum}(t, \text{true}) = t$$

$$\text{Sum}(t, \text{false}) = 0$$

$$\text{Sum}(0, \phi) = 0.$$

A term that contains neither + nor − anywhere is referred to as recursively monomial. The following result is based on an algorithm that rewrites an input term in a bottom-up pass using the above rules. Each AGCA term is equivalent to a finite sum $\pm t_1 \pm t_2 \ldots \pm t_m$ where $t_1, \ldots, t_m$ are recursively monomial terms. For example, Sum(t, (−φ)*((−ψ)+π)) simplifies to the recursively monomial Sum(t,φ*ψ)−Sum(t,φ*π). When e is either a formula or a term, vars(e) be the set of all variables occurring in e. Factorization employs the equivalence $$\text{Sum}(s*t, \phi*\psi) = \text{Sum}(s, \phi)*\text{Sum}(t, \psi)$$

which is true if (vars(s)∪vars(φ))∩(vars(t)∪vars(ψ))=∅. A monomial aggregate term can be maximally factorized in linear time in its size. For example, the term Sum(5*x*Sum(1,R(y,z))*w,R(x,y)*R(v,w)) factorizes as Sum(5,true)*Sum(x*Sum(1,R(y,z)),R(x,y))*Sum(w,R(v,w)). Recursive factorization, given term Sum(t,φ), recursively, for example, from the bottom-up, factorizes the aggregate terms in t before applying factorization as just described to Sum(t,φ) itself. Unneeded variables can be eliminated from queries, variables that are neither bound nor do they occur in relation atoms, but obtain their values through condition atoms that equate them with other variables. For a AGCA term Sum(t,φ) and a set of bound variables B, then there is an equivalent term Sum(t',ν) such that each variable in ψ either occurs in a relational atom $R(\vec{x})$ of ψ or in B. Given an arbitrary monomial formula φ with variables vars(φ) and a set of bound variables B, there is a monomial formula ψ with variables vars(ψ) such that each variable in vars(ψ) either occurs in a relational atom $R(\vec{x})$ of ψ or in B and ∃(vars(φ)−B)φ is equivalent to ∃(vars(ψ)−B)ψ. Variables are eliminated that occur in constraint atoms xθy but neither in relational atoms nor in B. If φ=∧(E∪O), where E is the set of equality atoms x=y and O is the set of remaining atoms (either set may be empty), and a set of bound variables, redundant variables are eliminated as follows. For each equivalence class C of the equivalence relation E, an element (i.e., variable) can be distinguished as $x_C$ such that, if B∩C≠∅, $x_C$ is an arbitrary element of B∩C; otherwise, it is an arbitrary element of C. A unification mapping Θ can be created that maps each unbound variable y of E to $x_{[y]}$ (where [y] is the equivalence class of y) and is the identity on the bound variables. Variables in O can be substituted using Θ, obtaining O'. If E'=∪{y=$x_{[y]}$|y∈((B∩[y])−{$x_{[y]}$})}, then φ can be replaced by (∧O')∧∧E'. This can eliminate redundant variables involved in equalities. Variables involved in inequality constraints can occur either in B or in a relational atom, otherwise φ has to be unsafe.

In the case where Sum(t,φ) (where φ is a monomial) and bound variables are defined, variables can be eliminated by first eliminating variables in φ, creating φ' and Θ. Then variables of t can be substituted that are in the domain of Θ using Θ, obtaining t'. The result, Sum(t',φ'), is equivalent to Sum(t, φ).

In the language of the present embodiment, NC0C, for incremental update-event processing that admits massive parallelization, state is represented by finite map data structures (associative arrays), mapping tuples to numbers. NC0C can be a restricted imperative language, similar to C both in syntax and semantics. There are at least two differences between NC0C and C. The first is in the initialization of undefined map values, which uses special syntax to account for the fact that NC0C procedures are update triggers for the map data structures. The second is in looping, which is performed over a set of values that is intentionally not made explicit in the syntax of NC0C (for example, it can be a form of constrained structural recursion over the map—and thus can admit parallelization). AGCA queries can be compiled to NC0C programs that perform incremental view maintenance. These compiled programs only use the maps to represent the view and auxiliary data; no database beyond these is accessed. A map (read) access, where m is a map name, is written as m[$\vec{x}$]. An NC0C term is an arithmetic expression built from variables, constants, map accesses, functional ifs of the form if φ then t else 0 or, using C syntax, (φ?t:0), and arithmetic operations + and *. A condition φ is a Boolean combination of (in)equalities over variables and constants. An NC0C trigger is of the form $$\text{on } \pm R(\vec{x}\,\vec{y})\{s_1; \ldots ; s_k\}$$

where ± indicates insertion respectively deletion, R is a relation name, $\vec{x}\,\vec{y}$ are variables (the trigger arguments), and $s_1, \ldots, s_k$ are NC0C statements of the form $$\text{for each } \vec{z} \text{ do } m[\vec{x}\,\vec{z}]<t_{init}> \pm = t$$

where $\vec{z}$ are variables distinct from $\vec{x}\,\vec{y}$, t is an NC0C term, and $t_{init}$ is an NC0C term without map accesses that uses only variables from $\vec{x}\,\vec{z}$, called the initializer of $m[\vec{x}\,\vec{z}]$. If $t_{init}$ is 0, it can be omitted and $m[\vec{x}\,\vec{z}]$ can be written rather than $m[\vec{x}\,\vec{z}]<0>$. If $m_1[\vec{v}_1], \ldots, m_k[\vec{v}_k]$ are the map accesses in the right-hand side term t, then $m, m_1, \ldots, m_k$ must be pairwise distinct and the variables in $\vec{v}_1, \ldots, \vec{v}_k$ must be a nonoverlapping subsets of the variables in $\vec{x}\,\vec{y}\,\vec{z}$. Statements of the form (1) can be abbreviated with $\vec{z}=<>$ as $$m[\vec{x}]<t_{init}> \pm = t.$$

An NC0C program can include of a set of triggers, one for each update event ±R. The semantics of NC0C terms can be, for example, the same as in C. A statement of form (1) can perform the following for each valuation θ of the variables $\vec{z}$ (extending the valuation of variables $\vec{x}\,\vec{y}$ passed to the trigger via its arguments) such that all map accesses in right-hand side t are defined. If $m[\vec{x}\,\vec{z}]$ is undefined, it can be initialized with $t_{init}$. Then, unconditionally, $m[\vec{x}\,\vec{z}]+=t$ can be executed. An "on $\pm R(\vec{x}\,\vec{y})$" trigger fires if the update is of the form $\pm R(\vec{x}\,\vec{y})$ and executes the statements $s_1; \ldots ; s_k$ of its body sequentially (as in C). Compilation algorithms can create multiple triggers for the same update event. However, NC0C programs do not have cyclic dependencies between triggers: there is no trigger that reads one map that the other updates and vice-versa (there is a hierarchy of maps). Assuming without loss of generality that the argument variable tuples of distinct triggers for the same update event are the same, a topological sort of the triggers can be performed that assures that no map is read after it is written, and their bodies can be concatenated according to this sort to obtain a single trigger per update event. An exemplary NC0C on-insert trigger follows:

```
on +C(cid, nation) {
  q[cid] += q1[nation];
  foreach cid2 do q[cid2] += q2[cid2, nation];
  q[cid] += 1;
  q1[nation] += 1;
  q2[cid, nation] += 1
}
```

The initializers are all 0, and are thus omitted. The trigger on −C is obtained by changing += to −= everywhere in the above trigger except for the third statement (q[cid]+=1), which remains unchanged.

FIG. 2 is a table of a trace of map q that changes during a sequence of insertions and deletions. The Δq[x] columns indicate the changes made to q[x] on each update. Methods for compiling AGCA queries to exemplary language NC0C can be given. AGCA sum terms excluding nested aggregates and inequality join conditions (i.e., involving two variables, e.g. x<y; non-join conditions such as x>5 are permitted) are known herein as primitive AGCA terms. NC0C initializers can be, but are not required to be, constants so as going to the database to compute is not necessary. An AGCA term $t=\text{Sum}(t_0,\phi)$ is called constraints-only if φ does not contain relational atoms $R(\vec{x})$. When φ contains only bound variables, t can be a (functional) if-statement "if φ then $t_0$ else 0" or, using C syntax, "φ?$t_0$:0". MakeC(t,B) can be a function that turns t into the corresponding functional if-statement after performing variable elimination using bound variables B. In the present embodiment there is a compilation method for AGCA terms Sum(t, φ) that does not contain nested aggregates, i.e., neither t nor φ contain Sum terms. In the present embodiment, any primitive AGCA term can be compiled into an NC0C program that incrementally maintains it. To create on-insert (+R) and on-delete (−R) triggers that incrementally maintain map $q[\vec{b}]$ of Sum term t, the following method can be executed as Compile0(q, $\vec{b}$, t):

---

Compile0( q , $\vec{b}$ , t ) outputs an NC0C program
  begin
    for each relation R in the schema, ± in {+,−} do
      $\vec{a}$ := turn sch(R) into a list of new variable names;
      $t_{init}$ := $[[t]]_T(\emptyset, \vec{a}\,\vec{b})$;
      t' := $\Delta_{\pm R(\vec{a})}t$ ;
      if t' is constraints only then t'' := MakeC( t' , $\vec{a}\,\vec{b}$ )
      else t'' := $q_{\pm R}[\vec{a}\,\vec{b}]$; Compile0( $q_{\pm R}$, $\vec{a}\,\vec{b}$ , t' ) end if;
      output on ±R($\vec{a}$) {foreach $\vec{b}$ do q[$\vec{b}$] < $t_{init}$ > += t'' }
    end

--- q±R is a new map name for an auxiliary materialized view. When $\vec{b}$ is the empty tuple, "for each $\vec{b}$ do" can be omitted from the NC0C statement. The method of the present embodiment takes an aggregate query $t=\text{Sum}(t_0,\phi)$ with bound variables $\vec{b}$ and defines a map $q[\vec{b}]$ for it, representing a materialized view of the query. The method can create a trigger for each possible update event ±R which specifies how to update $q[\vec{b}]$ when this event occurs. To create a trigger, the method can compute the delta t' of the query, and can create a new map q±R representing a materialized view of the delta. The statement increments $q[\vec{b}]$ by q±R[•], and uses the result of evaluating term t on the empty database as the initializer for $q[\vec{b}]$. In particular, on Sum terms t that are not constraints-only, $t_{init}$=0. The new map q±R is incrementally maintained as well. To do this, the method recursively calls itself and terminates because the delta t' eventually reaches degree 0 (i.e., is constraints-only). In this case no new map is created for it but t' (turned into an NC0C term using MakeC) itself is used as the right-hand side of the NC0C statement. For example, if q[ ]=Sum(1,R(x)*S(x)), then $$\Delta_{\pm R(u)}q = \pm\text{Sum}(1,(x=u)*S(x))=:q_R[u]$$

$$\Delta_{\pm S(v)}q = \pm\text{Sum}(1,R(x)*(x=v))=:q_S[v]$$

$$\Delta_{\pm S(v)}q_R[u] = \pm\text{Sum}(1,(x=u)*(x=v))$$

$$\Delta_{\pm R(u)}q_S[v] = \pm\text{Sum}(1,(x=u)*(x=v))$$

If MakeC(Sum(1,(x=u)*(x=v)))=if(u–v) then 1 else 0. Compile0 produced the NC0C insert triggers on +R(u){q[ ]+=qR[u]} on +R(u){for each v do qS[v]+=if(u=v) then 1 else 0} on +S(v){q[ ]+=qS[v]} on +S(v){for each u do qR[u]+=if(u=v) then 1 else 0}

The delete triggers are obtained from the insert triggers by replacing all occurrences of + by –, To loop over fewer variables, aggregates can be extracted. For a term t and its set B of bound variables, the function Extract (t, B) can replace each maximal subterm s for t that is of the form Sum(•,•) but is not constraints-only, by a map access $m[\vec{x}]$. m is a new name and $\vec{x}$ are those variables of B that occur in s, turned into an arbitrarily ordered tuple. The results of Extract is a pair (t', Θ) of the remainder term t' and a mapping Θ from map accesses $m[\vec{x}]$ to extracted subterms s which could be used to undo the extraction. That is, t' is constraints-only and t' with its map accesses substituted using Θ is t. For example, if t is the term Sum(x*Sum(v,R(v,z)), y=z)*Sum(u,R(x,u)). extract (t,{x,y}) returns the pair (t',θ) including term t'=Sum(x*$m_1$[z]<θ($m_1$[z])>,y=z)*$m_2$[x])<θ($m_2$[x])> and the mapping θ={$m_1$[z] ↦ Sum(v,R(v,z));$m_2$[x] ↦ Sum(u,R(x,u))}.

If ψ is a constraints-only term in which all variables are bound and $t_0$ is a term in which all variables are bound, then Sum(t,φ,ψ)=Sum(Sum(t,φ),ψ)

$t_0$*Sum(t,ψ)=Sum($t_0$*t,ψ)

Thus, given a recursively monomial term, ψ can be lifted to the top. For example, LiftIfs(Sum(1,C($c_2$,n)*($c_1$=c)),{$c_1$,c,n})=

Sum(Sum(1,C($c_2$,n)),$c_1$=c).

To address further auxiliary functions, Simplify (t, B), given an aggregate term t and a set of bound variables B,
turns t into an equivalent sum of (inverses of) recursive monomials,
recursively factorizes each of the result monomials,
eliminates all variables others than those in B or a relational atom, and
performs LiftIfs(•, B).
The result t$±_1t_1$ . . . $±_nt_n$ is equivalent to t and the t, are recursive monomials involving only variables in B.
ElimLV is a function that takes an NC0C statement foreach $\vec{x}\vec{y}$ do q[$\vec{x}\vec{y}$]+=if $\vec{x}=\vec{z}$ then t else 0 and simplifies it to the equivalent statement foreach $\vec{y}$ do q[$\vec{z}\vec{y}$]+=t.

The method Compile(m, $\vec{b}$, t), outputting an NC0C program, can be invoked in a similar way to Compile0 except that the delta of the query is first simplified and the non-constraints-only aggregates are extracted.

```
Compile( m , b , t )
begin
  for each relation R in the schema, ±₀ in {+,–} do
    a := turn sch(R) into a list of new variable names;
    t_init := [[t]]_T(Ø, a b);
    t' := Δ_{±₀R(a)}t ;
    ( ±₁t₁...±ₙtₙ, Θ ) := Extract(Simplify( t' , a b ), a b );
    foreach i from 1 to n
      s_i := (foreach b do m[b] < t_init > (±_i)= MakeC( t_i, a b ));
      output on ±₀R(a) { ElimLV(s_i) };
    foreach (m'[x]↦t'') in Θ do Compile( m',x,t'' );
end
```

The result is a sum of constraints-only recursive monomials with map accesses. Each of the recursive monomials becomes a separates statement because, using LiftIfs and ElimLV, the loop variables are removed, and each of the statements (monomials) can loop over a different subset of the argument variables of the map representing the query (the remaining variables are substituted by constants). Given a primitive term t and bound variables $\vec{x}$ by which results are to be grouped, the output of Compile(m, $\vec{x}$, t) is an NC0C program that can maintain query t in map $m[\vec{x}]$ under inserts and deletes. For example, Compile can simplify the two foreach-loop statements of the triggers given previously to qS[u]+=1 and qR[v]+=1. The resulting triggers have no loops and run in constant sequential time. For example, an AGCA query compilation can be invoked as follows:

Compile(q,{$c_1$},Sum(1,C($c_1$,$n_1$)*C($c_2$,$n_2$)*($n_1$=$n_2$))).

A sum of (inverses of) recursive monomials equivalent to $\Delta_{±C(c,n)}$q[$c_1$] has been previously computed. Factorization on that query is the identy. Eliminating variables with variables ($c_1$,c,n) bound yields ±Sum(1,($c_1$=c)*C($c_2$,n))±Sum(1,C($c_1$,n))+Sum(1,$c_1$=c). The result of if-lifting for the first of the three monomials is LiftIfs(Sum(1,C($c_2$,n)*($c_2$=c)),{$c_1$,c,n})= sum(sum(1,C($c_2$,n)),$c_1$=c).

For the other two monomials, variables elimination is the identity.

Extract(Simplify($\Delta_{±C(c,n)}$q[$c_1$,{$c_1$,c,n$}$),{$c_1$,c,n})

yields (±$t_1$±$t_2$+$t_3$,Θ) where $t_1$=Sum(q1[n],$c_1$=c),$t_2$=q2[$c_1$,n], $t_3$=Sum(1,$c_1$=c), and $$\Theta = \begin{Bmatrix} q1[n] & \mapsto & Sum(1, C(c_2, n)) \\ q2[c_1, n] & \mapsto & Sum(1, C(c_1, n)). \end{Bmatrix}$$

The statements $s_1$, $s_2$, $s_3$ are
foreach $c_1$ do q[$c_1$]±=if $c_1$=c then q1[n] else 0;
foreach $c_1$ do q[$c_1$]±=q2[$c_1$, n];
foreach $c_1$ do q[$c_1$]±=if $c_1$=c then 1 else 0
ElimLV can simplify these statements, and the resulting triggers are on ±C(c,n){q[c]±=q1[n] else 0} on ±C(c,n){foreach $c_1$ do q[$c_1$]±=q2[$c_1$,n]} on ±C(c,n){q[c]±=1} q1 and q2 can be compiled. Since $\Delta_{±C(c',n')}$q1[n]=$\Delta_{±C(c',n')}$q2[c,n]=±1, The compiled NC0C program after merging triggers as described previously is

```
on +C(cid, nation) {
    q[cid] += q1[nation];
    foreach cid2 do q[cid2] += q2[cid2, nation];
    q[cid] += 1;
    q1[nation] += 1;
    q2[cid, nation] += 1
}
```

Compilable AGCA terms are those without nested aggregates or inequality join conditions. The second requirement of that definition can be replaced by the requirement to exclude terms that are unsafe if the set of bound variables is set to Ø or where this condition can become true for a k-th delta. For example, the query q[ ]=Sum(1,R(x)*S(y*(x<y)) can be excluded because its delis m[y]=Sum(1,R(x)*(x<y)) is safe for bound variable y, but unsafe for the empty set of bound variables. On an insertion into R, it is not known for which y values the map m should be updated. If it a global, immutable active domain is assumed, it is not necessary to compute initial values, and the compilation methods can be applicable to all Sum terms with simple conditions, i.e. for which taking deltas simplifies the query structure. For primitive queries, for the initialization of a map value, $m[\vec{a}]<t_{init}>$, $t_{init}$ can be evaluated on the empty database, and contents of the database are not visible to query $t_{init}$ or would otherwise have caused initialization of $m[\vec{a}]$ earlier.

Referring now to FIG. 3, system 100 of the present embodiment can include, but is not limited to including, query compiler 13 which can include, but is not limited to including core data structures 15, a conventional SQL parser 17 such as, for example, GSP's SQL parser, compilation algorithm 19 and query transformation library 21. System 100 receives query 11 and produces query source code 22, which implements a query runtime 23, that is received by conventional source code compiler 27, which produces compiled binary 29. Core data structures 15 can include, but are not limited to including, ring 15A, hypergraph 15B, NC0C abstract syntax tree (AST) 15D, a data structure to describe NC0C programs as presented above, and a standard query AST 15C, a conventional data structure that describes queries as produced by the conventional SQL parser. A hypergraph is a pair (V, E) where V is a set "of nodes" and E is a set of subsets of V. Thus, a hypergraph generalizes a graph in that edges become so-called "hyperedges" (the members of E), which connect possibly more or fewer than two nodes with each other. SQL Parser 17 can receive, but is not limited to receiving, query 11 and information from core data structures 15 to provide initial query AST 18 to compilation algorithm 19. Compilation algorithm 19 can include, but is not limited to including, initializer 19A, elimLV 19B, extract 19C, and MakeC and Output 19D. Compilation algorithm 19 can receive information from core data structures 15, initial query AST 18, and delta queries 20 which have undergone variable elimination and factorization and can provide delta queries 20 to query transformation library 21, and also can provide query source code 22 that implements query runtime 23. Initializer 19A, elimLV 19B, extract 19C, and MakeC and Output 19D have been described in detail previously. Query transformation library 21 can include, but is not limited to including, delta computation 21A and simplify 21B, also described in detail previously. Query transformation library 21 can receive information from core data structures 15, and can provide delta queries 20 to compilation algorithm 19. Query runtime 23 can include, but is not limited to, map definitions 23A, which are source code declarations for maps, and thus materialized views, being maintained by NC0C program 23B as described above, as received in the query source code 22 from compilation algorithm 19, and can be provided to a conventional source code compiler 25 to yield a compiled binary 27.

Figure 4:
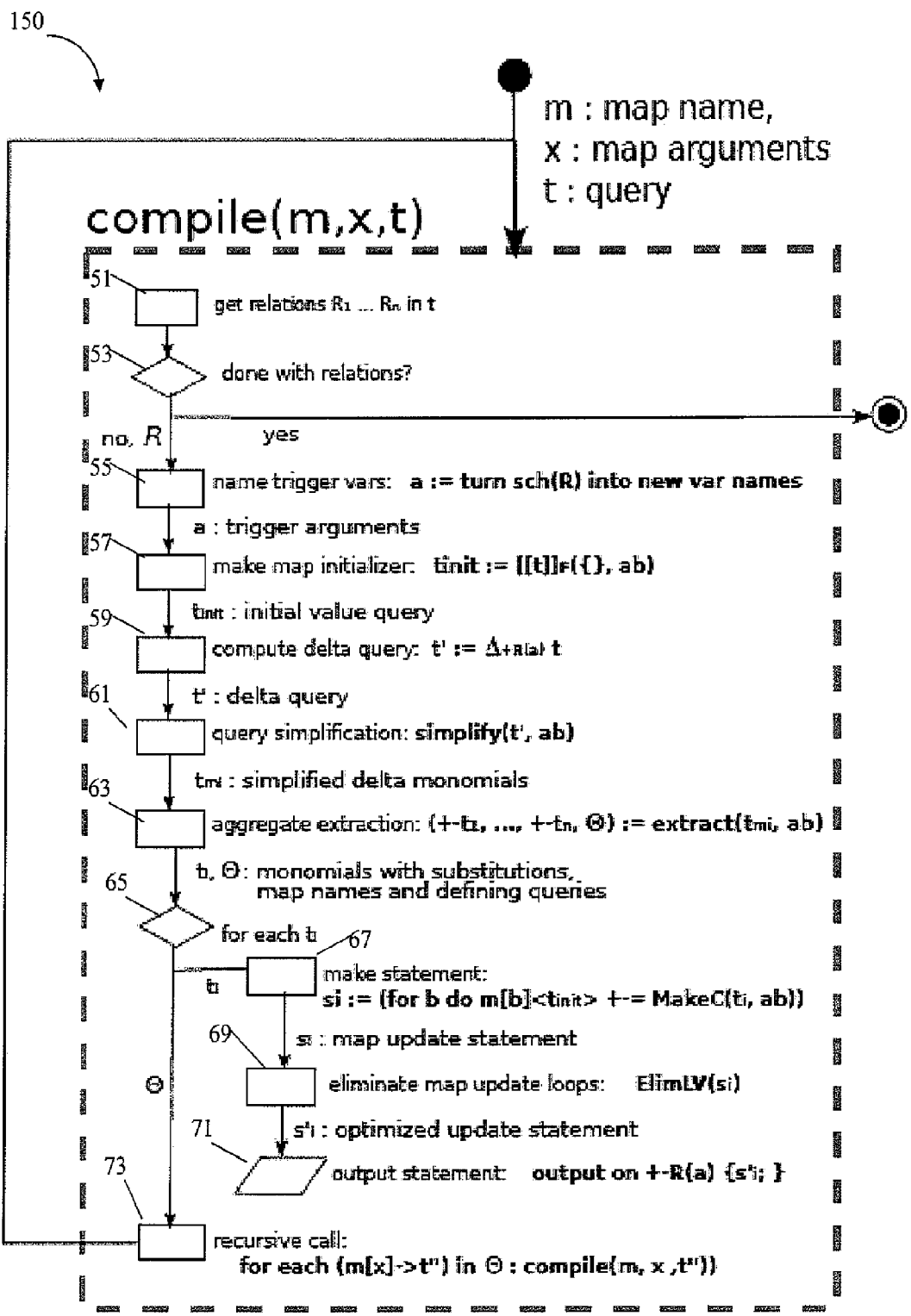
FIG. 4 is a flowchart of the method of the present embodiment.

Referring now to FIG. 4, method 150 executed by query compiler 13 of the present embodiment can include, but is not limited to including, the steps of receiving map name m, map arguments x, and query t, determining 51 relations R in query t, assigning 55 names a to trigger arguments based on the schema of R, if 53 there are more relations R, creating 57 initial value query $t_{init}$, for query t based on trigger arguments a and map arguments x, computing 59 delta query t' based on query t, trigger arguments a and relation R, simplifying 61 delta query t based on trigger arguments a and map arguments x to produce simplified delta monomials $t_{mi}$, extracting 63 aggregates based on simplified delta monomials $t_{init}$, trigger arguments a, and map arguments x to produce monomials t, with substitutions, map names, and defining queries, for each 65 $t_i$ creating 67 map update statement $s_i$ based on map arguments x, map name m, initial value query $t_{init}$, delta query t', and trigger arguments a, eliminating 69 map update loops to produce optimized update statement $s'_i$, based on update statement $s_i$ and storing 71 optimized update statement $s'_i$, based on trigger arguments a and relation R, and recursively calling 73 query compiler 13 with arguments based on map name m, map arguments x, and delta delta query t".

An alternate method for creating code to optimize queries of a database can include, but is not limited to including, the steps of (a) receiving a map name, map arguments, and a query, (b) determining relations in the query, (c) determining trigger arguments from each of the relations, (d) computing an initial value query based on an evaluation of the query, the map arguments, and the trigger arguments, the initial value query being computed by executing the query by a conventional query processor on an empty database, (e) computing a delta query based on the query, the relation, and the trigger arguments, the delta query being computed by conventional delta query computation for incremental view maintenance, (f) computing simplified delta monomials based on the delta query, the trigger arguments, and the map arguments by performing the steps of: (1) computing a polynomial version of the query, (2) applying factorization to each monomial of the polynomial, (3) eliminating from each of the monomials the trigger arguments and the map arguments that can be can be connected by equality to other of the trigger arguments and the map arguments, and (4) creating the simplified delta monomials from monomials in which the trigger arguments and the map arguments do not reference the database, (g) extracting aggregates as the monomials that reference the database based on the simplified delta monomials, the map arguments, and the trigger arguments, (h) computing a map update statement for each of the simplified delta monomials based on the simplified delta monomial, the map arguments, and the trigger arguments, (i) computing optimized update statement by eliminating map update loops from the map update statement for each revised simplified delta monomial based on the map update statement, the optimized update statement being computed by ElimLV, (j) generating code from the optimized update statements based on the relation and the trigger arguments, (k) repeating steps (a)-(k) when there are more of the relations in the query, (l) for each aggregate query in the delta query, recursively applying steps (a)-(m) to the aggregate query, the arguments including the trigger arguments remaining in the aggregate query after simplification, and (m) repeating steps and (a) through (m) when there are more of the aggregates.

Referring primarily to FIG. 4, method 150 can be, in whole or in part, implemented electronically. Signals representing actions taken by elements of system 100 (FIG. 3) can travel over electronic communications media and from node to node in a communications network. Control and data information can be electronically executed and stored on computer-readable media. Method 150 can be implemented to execute on a node in a computer communications network. Common forms of computer-usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, thumb drive, any other memory chip or cartridge, or any other medium from which a computer can read. From a technological standpoint, a signal or carrier wave (such as used for Internet distribution of software) encoded with functional descriptive material is similar to a computer-readable medium encoded with functional descriptive material, in that they both create a functional interrelationship with a computer. In other words, a computer is able to execute the encoded functions, regardless of whether the format is a disk or a signal. System 100 (FIG. 3) can include a communications network that can include at least one node for carrying out method 150. System 100 (FIG. 3) can be a distributed network (such as a network utilizing a distributed system format such as, but not limited to, DCOM or CORBA) where computer data signal (such as, but not limited to, signals over the Internet) traveling over the communications network carrying information capable of causing a computer system in the communications network to practice method 150. The communications network can be a conventional network; the signal is modulated and supplemental data is embedded utilizing conventional means. System 100 (FIG. 3) can include a computer readable medium having instructions embodied therein for the practice of method 150.

What is claimed is:

1. A processor implemented method for incrementally maintaining a representation of the result of a computation using k-th deltas of a specification, the specification being a database query, for k>1, comprising the steps of:
   materializing representations of the computation results of multiple levels of the specification;
   maintaining the materialized representations concurrently;
   maintaining the materialized representation of level k under updates using materialized representations of a level greater than k; and
   performing the updates of the representation by the computation whose inputs are a state of the representation, update information related to the updates, and at least one of the representations of the specifications of a level greater than k, the specifications constituting a set, operations on the set of specifications obtaining properties of a ring of databases, the ring of databases being used to define an aggregate query calculus comprising operations on the set;
   the properties of the aggregate query calculus including having a full additive inverse and having a property of distributivity;
   wherein the steps of materializing representations, maintaining the materialized representations, and performing the updates of the representation are performed by one or more processors executing computer readable code embodied in non-transitory computer usable media.

2. The method of claim 1 further comprising the step of: compiling the database query.

3. The method of claim 1 further comprising the step of: performing operations between a plurality of the representations to maintain a hierarchy of the representations and to update the representations.

4. The method of claim 1 further comprising the step of: performing the computations on the updates by code obtained by compilation of the specification.

5. The method of claim 1 further comprising the step of: performing the computations on at least one computer by machine code obtained by compilation of the specification.

6. The method of claim 1 further comprising the step of: performing the computations on hardware generated to execute machine code obtained by compilation of the specification.

7. The method of claim 1 further comprising the step of: performing the computations on at least one Boolean circuit executing machine code obtained by compilation of the specification.

8. The method of claim 1 wherein the representations of the computation results of specifications are relations.

9. The method of claim 1 wherein the representations of the computation results of specifications are finite functions.

10. The method of claim 1 wherein the representations of the computation results of specifications are hash tables.

11. The method of claim 1 further comprising the step of: parallelizing incremental view maintenance.

12. A computer node in communications with the Internet for carrying out the method according to claim 1.

13. A communications network in communications with the Internet having a computer node for carrying out the method according to claim 1.

14. A non-transitory computer-readable medium having instructions for carrying out the method according to claim 1.

15. A processor implemented method for creating code to optimize queries of a database comprising the steps of:
   (a) receiving a map name, map arguments, and a query;
   (b) determining relations in the query;
   (c) determining trigger arguments from each of the relations;
   (d) computing an initial value query based on an evaluation of the query, the map arguments, and the trigger argument;
   (e) computing a delta query based on the query, the relation, and the trigger arguments;
   (f) computing simplified delta monomials based on the delta query, the trigger arguments, and the map arguments by performing the steps of:
      (1) computing a polynomial version of the query;
      (2) applying factorization to each monomial of the polynomial;
      (3) eliminating from each of the monomials the trigger arguments and the map arguments that can be connected by equality to other of the trigger arguments and the map arguments; and
      (4) creating the simplified delta monomials from monomials in which the trigger arguments and the map arguments do not reference the database;
   (g) extracting aggregates as the monomials that reference the database based on the simplified delta monomials, the map arguments, and the trigger arguments;
   (h) computing a map update statement for each of the simplified delta monomials based on the simplified delta monomial, the map arguments, and the trigger arguments;

(i) computing optimized update statement by eliminating map update loops from the map update statement for each revised simplified delta monomial based on the map update statement;

(j) generating code from the optimized update statements based on the relation and the trigger arguments;

(k) repeating steps (a)-(k) when there are more of the relations in the query;

(l) for each of the aggregates, recursively applying steps (a)-(l) when there are more of the aggregates, the arguments for said step of recursively applying include the trigger arguments remaining in the aggregate after said step of creating the simplified delta monomials;

wherein steps (a)-(l) are performed by one or more processors executing computer readable code embodied in non-transitory computer usable media.

16. A computer node in communications with the Internet for carrying out the method according to claim 15.

17. A communications network in communications with the Internet having a computer node for carrying out the method according to claim 15.

18. A non-transitory computer-readable medium having instructions for carrying out the method according to claim 15.

19. A system for incrementally maintaining a representation of the result of a computation using k-th deltas of a specification, for k>1, the specification being a database query, the system comprising:

one or more hardware computer components;

non-transitory computer usable media having computer readable code embodied therein, the computer readable code, when executed by the one or more computer components, causing the one or more computer components to:

create materialized representations of the computation results of multiple levels of the specification;

create a first computer program to maintain the materialized representations concurrently;

create a second computer program to maintain the materialized representation of level k under updates using the materialized representations of a level greater than k; and create a third computer program to perform the updates of the representation by the computation whose inputs are a state of the representation, update information related to the updates, and at least one of the materialized representations of the specifications of a level greater than k; operations on a set of the specifications obtaining properties of a ring of databases, the ring of databases being used to define an aggregate query calculus comprising operations on the set; the properties of the aggregate query calculus including having a full additive inverse and having a property of distributivity; and create machine code from the first computer program, the second computer program, and the third computer program.

\* \* \* \* \*